United States Patent
Giesen et al.

(10) Patent No.: US 12,536,010 B2
(45) Date of Patent: Jan. 27, 2026

(54) METHOD AND SYSTEM FOR SUPPORTING SMART CONTRACTS IN A BLOCKCHAIN NETWORK

(71) Applicant: NEC Laboratories Europe GmbH, Heidelberg (DE)

(72) Inventors: Jens-rene Giesen, Duisburg (DE); Michael Rodler, Duisburg (DE); Lucas Davi, Duisburg (DE); Sebastien Andreina, Heidelberg (DE); Ghassan Karame, Heidelberg (DE)

(73) Assignee: NEC CORPORATION, Tokyo (JP)

( * ) Notice: Subject to any disclaimer, the term of this patent is extended or adjusted under 35 U.S.C. 154(b) by 303 days.

(21) Appl. No.: 18/031,164

(22) PCT Filed: Feb. 26, 2021

(86) PCT No.: PCT/EP2021/054838
§ 371 (c)(1),
(2) Date: Apr. 11, 2023

(87) PCT Pub. No.: WO2022/078632
PCT Pub. Date: Apr. 21, 2022

(65) Prior Publication Data
US 2024/0020109 A1 Jan. 18, 2024

(30) Foreign Application Priority Data
Oct. 13, 2020 (EP) .................................... 20201543

(51) Int. Cl.
*G06F 8/65* (2018.01)
*G06F 8/30* (2018.01)
(Continued)

(52) U.S. Cl.
CPC ................. *G06F 8/65* (2013.01); *G06F 8/30* (2013.01); *G06F 8/42* (2013.01); *G06F 11/3604* (2013.01); *G06F 21/563* (2013.01); *G06F 21/577* (2013.01)

(58) Field of Classification Search
CPC ............ G06F 11/3604; G06F 11/3624; G06F 21/563; G06F 21/577; G06F 21/64; G06F 8/30; G06F 8/42; G06F 8/65
See application file for complete search history.

(56) References Cited

U.S. PATENT DOCUMENTS 11,170,097 B1 * 11/2021 Kim ........................ G06F 21/54
2022/0318399 A1 * 10/2022 Rodler .................... G06F 21/51

FOREIGN PATENT DOCUMENTS

| CN | 110807195 A | 2/2020 |
|---|---|---|
| JP | 2019003309 A | 1/2019 |
| WO | WO 2015191737 A1 | 12/2015 |

OTHER PUBLICATIONS

Yamaguchi, Fabian et al.; "Modeling and Discovering Vulnerabilities with Code Property Graphs"; *2014 IEEE Symposium on Security and Privacy*; May 18, 2014; pp. 590-604; XP032686160; IEEE; New York, NY, USA.

(Continued)

*Primary Examiner* — Hanh Thi-Minh Bui
(74) *Attorney, Agent, or Firm* — Leydig, Voit & Mayer, Ltd.

(57) ABSTRACT

A computer-implemented method for supporting smart contracts in a blockchain network is provided. The method includes translating a source code of a smart contract into an abstract syntax tree model and generating a code property graph based on the abstract syntax tree model. The method further includes performing an enrichment phase, a vulnerability detection phase, and a vulnerability patching phase. In the enrichment phase, the code property graph is enriched (Continued)

with information that is obtained from the abstract syntax tree model. In the vulnerability detection phase, the code property graph is analyzed for predetermined vulnerability patterns in order to detect predetermined vulnerabilities. In the vulnerability patching phase, one or more patches are applied in order to fix the predetermined vulnerabilities. In some examples, the method can perform improved decision-making by optimizing the process for efficiently hardening smart contracts such that vulnerabilities within the contract can be remedied and eliminated.

20 Claims, 2 Drawing Sheets

(51) Int. Cl.
    *G06F 8/41*     (2018.01)
    *G06F 11/3604*     (2025.01)
    *G06F 21/56*     (2013.01)
    *G06F 21/57*     (2013.01)

(56) References Cited

OTHER PUBLICATIONS

Zhang, Yuyao et al.; "Smartshield: Automatic Smart Contract Protection Made Easy"; *2020 IEEE 27th International Conference on Software Analysis, Evolution and Reengineering (SANER)*; Feb. 18, 2020; pp. 23-34; XP033752898; IEEE; New York, NY, USA.

* cited by examiner

METHOD AND SYSTEM FOR SUPPORTING SMART CONTRACTS IN A BLOCKCHAIN NETWORK

CROSS REFERENCE TO RELATED APPLICATIONS

This application is a U.S. National Phase application under 35 U.S.C. § 371 of International Application No. PCT/EP2021/054838, filed on Feb. 26, 2021, and claims benefit to European Patent Application No. EP 20201543.4, filed on Oct. 13, 2020. The International Application was published in English on Apr. 21, 2022 as WO 2022/078632 A1 under PCT Article 21(2).

FIELD

The present invention relates to a computer-implemented method for supporting smart contracts in a blockchain network.

Furthermore, the present invention relates to a computer system for supporting smart contracts in a blockchain network.

BACKGROUND

Since the inception and implementation of Bitcoin in 2009 cryptocurrencies reached a broad acceptance. Bitcoin was initially designed as a peer to peer payment infrastructure, with a concept called blockchain as the enabling technology. A blockchain is an append-only distributed data structure that enables mutually distrusting parties to participate in transactions with one another through the use of cryptographically secure signatures. Data can be stored on the blockchain in a decentralized and cryptographically secure way and in order to append data to the blockchain the participating nodes decide on appending data by following a consensus protocol, such as proof of work or proof of stake.

The emergence of the blockchain technology created a new market, that grew to consist of over 2500 cryptocurrencies today. These so-called altcoins are implemented using alternative blockchains to the Bitcoin infrastructure. In addition to the payment infrastructure, some of these altcoins also provide means to execute programs, usually called smart contracts, on the blockchain. One of the most prominent blockchain networks that feature smart contracts is the Ethereum blockchain. On the Ethereum blockchain, a smart contract is a program in a special bytecode format that is triggered whenever a transaction is sent to the contract's address. The smart contract is then executed in the Ethereum virtual machine (EVM) by the same nodes that verify and append the transactions to the blockchain. To this date, almost 2 million smart contracts are deployed on the Ethereum blockchain.

Ethereum smart contracts are Turing-complete programs that implement autonomous agents on the blockchain, as they are able to manage their own Ether cryptocurrency and trigger further actions such as creating transactions to other smart contracts, e.g. in order to transfer Ether to another account or call other smart contracts. However, just like traditional software, smart contracts are susceptible to programming mistakes. Additionally, the transactional nature of the blockchain paired with wrong assumptions about the programming model of smart contracts leads to a semantic gap. One such wrong assumption was at times that transactions execute one after another while actually transactions can start nested transactions. This ultimately leads to many bugs in smart contracts. Since smart contracts sometimes manage considerable amounts of cryptocurrency they are valuable targets for attackers looking to exploit security vulnerabilities for direct financial gain. One of the first infamous incidents in relation to smart contract exploitation was the "TheDAO" hack, which resulted in the loss of Ether worth 50 million US dollars at the time of the incident (cf. non-patent literature of Rob Price: "Digital currency Ethereum is cratering because of a $50 million hack", June 2016, retrievable at https://www.businessinsider.com/dao-hacked-ethereum-crashing-in-value-tens-of-millions-allegedly-stolen-2016-6). Here, the attacker exploited a so-called reentrancy vulnerability. Since smart contracts can send transactions to other smart contracts, this implies that a transaction can create nested transactions. In case of reentrancy vulnerabilities this fact is exploited to invalidate certain security relevant checks in the code of the victim smart contract. In the case of "The DAO" hack this allowed the attacker to repeatedly withdraw a certain amount of Ether by exploiting the reentrancy vulnerability.

Apart from reentrancy attacks, other issues exist, e.g. integer bugs like integer overflows and integer underflows, access control and input validation bugs, to name a few. In recent years several efforts were made to research new methods for the prevention of security vulnerabilities in smart contracts. These efforts follow several approaches ranging from symbolic execution to formal verification and static analysis. In this regard, it is exemplarily referred to the following non-patent literature:

Christof Ferreira Torres, Julian Schutte, et al. "Osiris: Hunting for Integer Bugs in Ethereum Smart Contracts". In: 34th Annual Computer Security Applications Conference (ACSAC18), San Juan, Puerto Rico, USA, Dec. 3-7, 2018. 2018. URL: http://orbilu.uni.lu/handle/10993/36757.

Loi Luu et al. "Making Smart Contracts Smarter". In: Proceedings of the 2016 ACM SIGSAC Conference on Computer and Communications Security. CCS '16. Vienna, Austria: ACM, 2016, pp. 254-269.

Mark Mossberg et al. "Manticore: A User-Friendly Symbolic Execution Framework for Binaries and Smart Contracts". In: (July 2019). arXiv: 1907.03890[cs.SE].

Sukrit Kalra et al. "ZEUS: Analyzing Safety of Smart Contracts". In: Proceedings 2018 Network and Distributed System Security Symposium. San Diego, CA: Internet Society, 2018.

Petar Tsankov et al. "Securify: Practical security analysis of smart contracts". In: Proceedings of the 2018 ACM SIGSAC Conference on Computer and Communications Security. ACM. 2018, pp. 67-82.

The large bulk of this work focus on statically analyzing smart contracts before deployment. While static analysis and verification is most useful for the smart contract developer, several dynamic analysis approaches have emerged that identify, and prevent, vulnerabilities during a smart contract's execution, similar to exploit mitigation mechanisms in traditional software. For example, Sereum was proposed as a system that does not only detect, but also mitigates reentrancy attacks through a locking mechanism enforced at runtime. In Sereum all participating nodes must run the analysis and flagged transactions are not included in the blockchain. Similarly, the non-patent literature of Torres et al.: "ÆGIS: Smart Shielding of Smart Contracts", In: Proceedings of the 2019 ACM SIGSAC Conference on Computer and Communications Security, CCS 2019, London, UK, Nov. 11-15, 2019. Ed. by Lorenzo Cavallaro et al.

ACM, 2019, pp. 25892591. DOI:10.1145/3319535.3363263, URL: https://doi.org/10.1145/3319535.3363263 proposed a solution where vulnerability patterns are managed within the blockchain and are voted upon by network participants. However, such dynamic analysis approaches have yet to be shown to be effectively integrated into the wider blockchain ecosystem, as they result in an increased semantic gap, because neither the source code, nor the bytecode of the contract reflect the security policy enforced by the dynamic analysis system. The detection of vulnerabilities is an especially important topic on its own, as the Ethereum blockchain prevents by design any alteration to a deployed smart contract's code. Thus, a smart contract cannot be upgraded easily if a vulnerability is discovered in the smart contract. There are, however, certain code patterns and features of the Ethereum platform that allow a contract to emulate the features necessary to make a contract upgradable. However, it is the contract developers responsibility to apply this pattern correctly if needed. Hence, given the criticality of any bug in a smart contract it is important to harden a smart contract's code.

SUMMARY

In an embodiment, the present disclosure provides a computer-implemented method for supporting smart contracts in a blockchain network. The method comprises: translating a source code of a smart contract into an abstract syntax tree model; generating a code property graph based on the abstract syntax tree model; performing an enrichment phase, wherein the code property graph is enriched with information that is inferable from the abstract syntax tree model; performing a vulnerability detection phase, wherein the code property graph is checked for one or more predetermined vulnerability patterns in order to detect one or more predetermined vulnerabilities; and performing a vulnerability patching phase, wherein one or more patches are applied in order to fix the one or more predetermined vulnerabilities detected in the vulnerability detection phase, wherein the one or more patches are inserted into the code property graph such that a patched code property graph is generated.

BRIEF DESCRIPTION OF THE DRAWINGS

Subject matter of the present disclosure will be described in even greater detail below based on the exemplary figures. All features described and/or illustrated herein can be used alone or combined in different combinations. The features and advantages of various embodiments will become apparent by reading the following detailed description with reference to the attached drawings, which illustrate the following.

DETAILED DESCRIPTION

Figure 1:
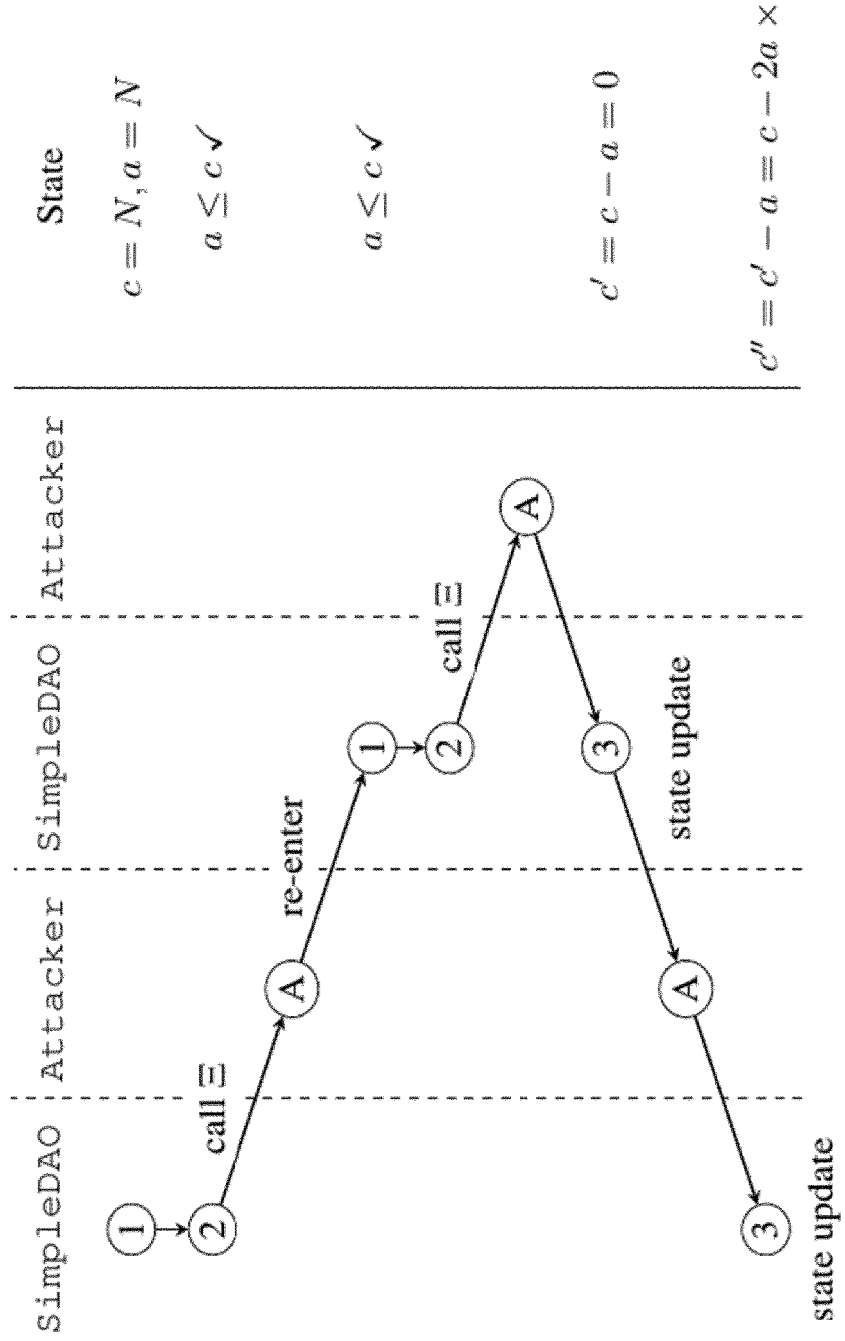
FIG. 1 is a source code example together with a schematic diagram illustrating an exemplary application scenario for an embodiment of the present invention, wherein the application scenario represents an attack against reentrancy vulnerability in the SimpleDAO contract, wherein the second check (2) passes, because it is performed on inconsistent internal state.

In an embodiment, the present invention improves and further develops a method and a computer system of the initially described type for supporting smart contracts in a blockchain network in such way that smart contracts are hardened efficiently, in particular in order to remedy potential vulnerabilities.

In another embodiment, the present invention provides a computer-implemented method for supporting smart contracts in a blockchain network, the method comprising:
translating a source code of a smart contract into an abstract syntax tree model;
generating a code property graph based on the abstract syntax tree model;
performing an enrichment phase, wherein the code property graph is enriched with information that is inferable from the abstract syntax tree model;
performing a vulnerability detection phase, wherein the code property graph is checked for one or more predetermined vulnerability patterns in order to find one or more predetermined vulnerabilities; and
performing a vulnerability patching phase, wherein one or more patches are applied in order to fix vulnerabilities found in the vulnerability detection phase, wherein the patches are inserted into the code property graph such that a patched code property graph is generated. Furthermore, in another embodiment, the present invention provides a computer system for supporting smart contracts in a blockchain network, the system comprising memory and one or more processors, which, alone or in combination, are configured to provide for execution of a method comprising:
translating a source code of a smart contract into an abstract syntax tree model;
generating a code property graph based on the abstract syntax tree model;
performing an enrichment phase, wherein the code property graph is enriched with information that is inferable from the abstract syntax tree model;
performing a vulnerability detection phase, wherein the code property graph is checked for one or more predetermined vulnerability patterns in order to find one or more predetermined vulnerabilities; and
performing a vulnerability patching phase, wherein one or more patches are applied in order to fix vulnerabilities found in the vulnerability detection phase, wherein the patches are inserted into the code property graph such that a patched code property graph is generated.

Runtime or compiler dependent policies are often used to implement defense mechanisms for native C/C++ software. However, according to the invention it has first been recognized that in the context of hardening smart contracts, developers of smart contracts want to review semantic changes made to their smart contract. Instead of enforcing hardening policies by modifying the semantics of the runtime environment or bytecode instrumentation, embodiments of the invention advocate for source code rewriting as the most transparent way to automatically harden smart contracts in an efficient way. Rewriting the source code preserves the inspectability of the smart contract and may leave the developers of smart contracts in charge to accept the changes and their implications. To that end, according to the invention, a source code of a smart contract is translated/converted into an abstract syntax tree model, in particular by a compiler entity. The abstract syntax tree model is then transformed into a code property graph, which may be used to conduct analyses for smart contracts that are to be checked. Furthermore, an enrichment phase is performed, wherein the code property graph is enriched with information that is inferable from/through the abstract syntax tree model. Then, by performing a vulnerability detection phase, the code property graph is checked for one or more predetermined vulnerability patterns in order to find one or more potential predetermined vulnerabilities. If predetermined vulnerability patterns are found, a vulnerability patching phase is performed, wherein one or more predetermined patches are applied in order to fix the one or more vulnerabilities found in the vulnerability detection phase. The patches are inserted directly into the code property graph such that a patched code property graph is generated.

Thus, the present invention provides a method and a system for supporting smart contracts in a blockchain network, wherein smart contracts are hardened efficiently, such that potential vulnerabilities in the contract can be remedied and eliminated.

According to embodiments of the invention, the blockchain network may be a distributed network having nodes, wherein a blockchain enables the nodes to participate in transactions with one another through the use of cryptographically secure signatures. Thus, a blockchain may be an append-only distributed data structure that enables mutually distrusting parties to participate in transactions with one another through the use of cryptographically secure signatures. Data can be stored on the blockchain in a decentralized and cryptographically secure way and in order to append data to the blockchain the participating nodes decide on appending data by following a consensus protocol, such as proof of work or proof of stake.

According to embodiments of the invention, a smart contract may be triggered whenever a transaction is sent to the smart contract's address. The smart contract may be executed in a virtual machine by blockchain nodes that verify and append transactions to the blockchain. Thus, a smart contract may be a program in a special bytecode format that is triggered whenever a transaction is sent to the contract's address.

According to embodiments of the invention, the code property graph may include a combined representation of a data flow graph, a control flow graph and/or a dominator tree. Thus, the code property graph may merge three graph representations of code into a joint data structure. Hence, the code property graph (CPG) is a representation of a program that unifies different perspectives on the program, which may be commonly achieved through static analysis. A major advantage of the concept of a code property graph is that the projected graph is not language dependent. This allows for re-use of many types of analysis as the analysis can be written for the graph and not a specific language.

According to embodiments of the invention, it may be provided that performing the enrichment phase includes a call-analysis. The call-analysis may comprise iterating over all function call expressions in the code property graph and assigning a call label to each external function call. Thus, suitable information for being applied and used efficiently in the vulnerability detection phase can be collected.

According to embodiments of the invention, it may be provided that performing the enrichment phase includes a contains-call-analysis. The contains-call-analysis may comprise analyzing sub expressions of every statement in the code property graph to find function calls and assigning a call label to each statement having a function call. Thus, suitable information for being applied and used efficiently in the vulnerability detection phase can be collected.

According to embodiments of the invention, it may be provided that performing the enrichment phase includes a write-state-analysis. The write-state analysis may comprise collecting all statements that change state variables of a smart contract and assigning a writes-state-label to the collected statements and their surrounding functions. The write-state-analysis may further include collecting all internal function calls calling functions that update/write state variables and assigning a writes-state-label to the collected internal function calls and their surrounding functions. Thus, suitable information for being applied and used efficiently in the vulnerability detection phase can be collected.

According to embodiments of the invention, the vulnerability pattern may be associated with a predetermined vulnerability. Predetermined vulnerabilities may include reentrancy, integer overflow bugs and/or integer underflow bugs. Thus, vulnerability patterns for detecting important potential vulnerabilities in smart contracts are considered.

According to embodiments of the invention, the vulnerability pattern may be expressed in the form of a CPG subgraph. Furthermore, performing the vulnerability detection phase may include searching for the CPG subgraph within the code property graph of the smart contract. Thus, the concept of code property graphs (CPGs) can be leveraged, which enables vulnerabilities to be formulated as a search for a specific subgraph representing the vulnerability. Hence, an efficient vulnerability detection is provided. Once the enrichment phase of the code property graph is completed, it may be provided that a checking for vulnerability patterns is performed in the vulnerability detection phase. These vulnerability patterns can be expressed in the form of different subgraphs of the code property graph. The presence of a particular subgraph in the code property graph indicates that the smart contract is susceptible to the associated vulnerability. Once all patterns associated with a vulnerability are found, the vulnerability discovery (i.e. vulnerability detection phase) ends and the vulnerability patching phase can start.

According to embodiments of the invention, it may be provided that performing the vulnerability detection phase includes querying the code property graph for statements $s_w$ that write state and the surrounding function f. Then it may be searched in the code property graph for external function calls $c_e$ that, considering the control flow of function f, transitively lead from $c_e$ to $s_w$. A state variable sv, which is manipulated by $s_w$ is also captured. If such a pattern is found, the code property graph may be also queried in the vulnerability detection phase for all functions $f_c$ that belong to the smart contract and that write to sv. Thus, reentrancy vulnerabilities can be efficiently detected. To that end, a reentrancy vulnerability pattern can be searched, which comprises a state variable sv, a statement $s_w$ that writes to the state variable sv, a surrounding function f of the statement $s_w$, an external function call $c_e$ that—considering the control flow off—transitively leads from $c_e$ to $s_w$, and a set of cross-functions $f_c$ that write to sv.

According to embodiments of the invention, it may be provided that, in the vulnerability detection phase, the code property graph is queried for statements $s_w$ that write state and the surrounding function f. Instead of external calls, a create-based reentrancy detection may search for constructor calls $c_c$ that, considering the control flow of f, transitively lead from $c_c$ to $s_w$. A CPG-based analysis allows to analyse the constructor that is being called. In this way, it may be provided that this vulnerability is only reported if the constructor contains an external call. This is useful because reentrancy cannot happen if no external call is made. If the con-structor calls an external function, the control property graph may be again queried for all functions that belong to the same contract and that also write to sv. Thus, reentrancy vulnerabilities can be efficiently detected.

According to embodiments of the invention, it may be provided that performing the vulnerability patching phase for applying a patch includes providing a lock variable $l_{sv}$ for sv as a state variable in the code property graph. This may include a check if sv already has a lock variable. If not, the lock variable $l_{sv}$ is created. The type of the lock variable $l_{sv}$ may depend on the type of sv itself, e.g. if sv has a basic type like unit 256, $l_{sv}$ will have type bool, but for mapping types only the value type will be bool. After $l_{sv}$ is either found or inserted to the control property graph, assignment statements are generated, which may set the state of $l_{sv}$. To that end, it may be provided that the locking statement lock_$l_{sv}$ sets the value to true, and the unlocking statement unlock_$l_{sv}$ sets the value to false. Then, the control flow of function f is changed in such a way that the locking statement, the external call and the unlocking statement directly follow each other: lock_$l_{sv}$→$c_e$→unlock_$l_{sv}$. After the control flow is altered, a guard may be created, which checks for $l_{sv}$ to be unlocked and inserts it at the beginning of the function f. The creation and insertion of guards may also happen with all the other functions $f_c$ that write to sv. Thus, an efficient patching of reentrancy vulnerabilities may be provided.

According to embodiments of the invention, the predetermined patches may be specifically crafted for the individual vulnerability patterns. Thus, embodiments of the invention relate to a novel approach to detect and fix vulnerabilities in smart contracts on the source code level in an efficient way. Embodiments of the invention leverage the concept of code property graphs (CPGs), which allows vulnerabilities to be formulated as a search for a specific subgraph representing the vulnerability. The code property graph can be leveraged to automatically generate source level patches for those vulnerabilities.

Thus, embodiments of the invention may include searching for a specific subgraph in the source code using code property graphs to automatically patch vulnerabilities of smart contracts at source code level. During the patching phase embodiments of the invention apply patches that fix all vulnerabilities and insert them directly into the CPG. When this is the case, embodiments of the invention traverse the patched CPG to generate the new source code. The patched smart contract may then be validated against all known transactions to ensure the contract behaves properly on benign transaction and prevents attacks.

According to embodiments of the invention, the patched code property graph is traversed to generate a new source code for the smart contract that incorporates the one or more applied patches.

Further features, advantages and further embodiments are described and may be become apparent in the following:

Embodiments of the invention may provide a hardening contract compiler (HCC) computer system, implemented as a toolchain, which automatically finds and patches vulnerabilities of smart contracts. The patches are applied on the source code, which preserves inspectability. This enables the developers to verify the changes introduced by HCC using the same methods they used before, e.g. manual code reviews, formal verification or other analysis tools. In contrast to prior static analysis tools, HCC strives to also fully harden smart contracts against certain classes of bugs. In the present disclosure, it is predominantly focused on the automated detection and prevention of specific vulnerabilities such as reentrancy vulnerabilities and integer overflow and underflow bugs. However, HCC may be designed to be a modular framework, which allows implementing further vulnerability detection and patching procedures with minimal effort. To this end, a static source code analysis approach is implemented based on code property graphs (CPG), which allows formulating vulnerability detection as queries on top of a generalized graph representing the program. HCC may be intended to be used by smart contract developers while they develop their smart contracts and automatically introduce hardening patches before deployment. However, the HCC system can also be employed to facilitate the manual patching workflow of already deployed contracts that are developed as upgradable contract (e.g., using the ZeppelinOS framework).

As maintaining inspectability regarding the changes to a contract is a goal, HCC in accordance with embodiments of the invention uses source code as an input and emits generated source code as an output. This way, the developers can ensure that HCC does not introduce semantic changes that affect benign transactions and therefore behavioral consistency is preserved. In between, several steps may be made: First, the source code is converted into an abstract syntax tree (AST). Then the AST transformed into a code property graph (CPG). A CPG is a combined representation of a control flow graph (CPG), a data flow graph (DFG) and a dominator tree (DT). This representation can be used to conduct several analyses, e.g. alias analysis. As the CPG at this point only represents the AST, it may be enriched with all information that can be inferred through the AST in order to allow such analyses. Afterwards, a pattern-based approach is followed to find subgraphs within the CPG that resemble certain vulnerabilities. These subgraphs are seen as candidates for the vulnerability. The HCC computer system may verify the absence of prevention mechanisms for this particular vulnerability in order to decide whether this subgraph needs patching or not. If the candidate proves to be a real vulnerability, HCC automatically applies patches based on the found pattern. After applying the patches for each discovered vulnerability, HCC traverses the CPG to generate new source code that incorporates the patches.

Thus, embodiments of the invention may provide a novel approach to detect and fix vulnerabilities in smart contracts on the source code level. The approach leverages the concept of code property graphs (CPGs), which allows vulnerabilities to be formulated as a search for a specific subgraph representing the vulnerability. Furthermore, the CPG can be leveraged to automatically generate source-level patches for those vulnerabilities.

Embodiments of the invention may be able to detect and patch reentrancy and integer overflow and underflow vulnerabilities in Solidity smart contracts.

Furthermore, embodiments of the invention may provide an analysis and patching tool that works across smart contracts boundaries.

There are several ways how to design and further develop the teaching of the present invention in an advantageous way. To this end it is to be referred to the patent claims subordinate to patent claim 1 on the one hand and to the following explanation of further embodiments of the invention by way of example, illustrated by the figure on the other hand. In connection with the explanation of the further embodiments of the invention by the aid of the figure, generally further embodiments and further developments of the teaching will be explained.

Ethereum smart contracts are plagued by several types of bugs that can lead to security vulnerabilities. The non-patent literature of Nicola Atzei, Massimo Bartoletti, and Tiziana Cimoli: "A Survey of Attacks on Ethereum Smart Contracts (SoK)"; In: Lecture Notes in Computer Science. Journal Abbreviation: Lecture Notes in Computer Science; Springer Berlin Heidelberg, 2017, pp. 164-186. DOI: 10.1007/978-3-662-54455-6_8; retrievable at http://dx.doi.org/10.1007/978-3-662-54455-6_8 presented a survey on famous vulnerabilities and attacks. The attacks range from DoS, such as in the "KotET" contract, to unavailable ether, as was the case for the Parity Multi-Sig wallet, and to attackers being able to steal ether. In the infamous case of "TheDAO" hack the attacker was able to transfer a tremendous amount of ether out of the vulnerable contract. The attack against "TheDAO" was possible due to a bug, which is known as a reentrancy vulnerability.

Reentrancy occurs when a contract calls an external contract which again calls into the calling contract within the same transaction. So within one transaction it is observed a call graph A→B→A. While reentrancy is used for the withdrawal pattern and several other programming patterns, it can be exploited if not carefully implemented. The infamous attack on "TheDAO" demonstrated how a vulnerable implementation can lead to a tremendous loss of Ether.

To support safe reentrancy solidity supports multiple high-level constructs for calling into another contract: transfer, send and call. While those three are all implemented as CALL instructions on the EVM level, they differ in that the transfer and send functions supply only a limited amount of gas. This limited amount of gas prevents the called contract from performing other gas-expensive instructions, such as performing further calls. However, using the wrong type of call, can lead to reentrancy vulnerabilities.

A reentrancy vulnerability happens when a contract is re-entered unexpectedly and the contract acts depending on some inconsistent internal state. FIG. 1 shows a simplified version of "TheDAO" contract due to the non-patent literature of Nicola Atzei, Massimo Bartoletti, and Tiziana Cimoli: "A Survey of Attacks on Ethereum Smart Contracts (SoK)" retrievable at http://dx.doi.org/10.1007/978-3-662-54455-6_8, exhibiting the same reentrancy vulnerability as the original "TheDAO" contract. Thus, FIG. 1 shows a schematic diagram illustrating an exemplary application scenario for an embodiment of the present invention, wherein the application scenario represents an attack against reentrancy vulnerability in the SimpleDAO contract. The SimpleDAO contract keeps an internal state that keeps track of the amount of ether that were invested into the SimpleDAO by an investor. The investor is allowed to withdraw that amount using the withdraw function. The withdraw function may perform three steps (cf. FIG. 1): (1) check whether the investor is allowed to withdraw the requested amount of ether, (2) send the amount of ether to the investor and (3) update the internal state, that the investor has now invested less ether in the SimpleDAO contract. Note that in the vulnerable SimpleDAO, step (2) is performed before updating the state in (3). This means that a malicious investor, can re-enter the contract and call withdraw again, which invokes check (2) again. However, the internal state is not yet updated to reflect the withdrawal in the previous call to withdraw, so the check will pass and the attacker is allowed to withdraw the amount again. Only at the end the internal state is updated.

The attacker can repeat the reentrancy until the whole SimpleDAO contract is drained of ether. To correct the example in FIG. 1, lines 3 and 4 (cf. the source code example depicted by FIG. 1) are swapped, such that (3) is performed before (2). This way the second invocation of (1) will operate on consistent state and the check will fail.

The example of FIG. 1 describes a traditional reentrancy vulnerability. However, reentrancy may follow several different vulnerability patterns:

Traditional reentrancy as described by the example of FIG. 1.

Cross-function reentrancy, where two public functions of the victim contract write to the same state independently. It is not necessary for these functions to be susceptible to traditional reentrancy when used alone.

Delegated reentrancy, which involves three contracts of which one is used as a library by the victim contract. Even if the involved functions of the library and the victim contract are not susceptible to traditional reentrancy, it is possible that the combination of those functions enables reentrancy. This happens whenever the state update and the external call happen in different functions, with one function from the victim contract and the delegate called function.

Delegated reentrancy can happen in two different ways: (i) an external call happens before a delegated call happens. Since delegated calls run in the context they are called in, a delegated call can change the state variables of a function. In the present disclosure, it is referred to this as "delegated case (i) re-entrancy". (ii) a delegated call happens before a state update is performed. Since a delegate called function might call an external function, this case can be treated the same as traditional reentrancy or cross-function reentrancy as described above. In the present disclosure, it is referred to this as "delegated case (ii) reentrancy".

Create-based reentrancy, that can happen when a contract creates a new contract before performing a state update. The constructor of the newly created contract may perform external calls to possibly malicious contracts These vulnerability patterns share the common behavior that state updates happen after an external call, which leads to inconsistent state when the contract is re-entered.

Although the present disclosure mainly focuses on reentrancy vulnerabilities, embodiments of the present invention are designed to be extensible to other vulnerabilities. There exist many approaches for the detection of reentrancy vulnerabilities in smart contracts. Many of these tools rely on symbolic execution, which may lead to path explosion. However, it was discovered that many known tools suffer from imprecisions as they work on the EVM level. Either the imprecisions are due to the focus on already deployed contracts and the analyses being done at EVM level or the known tools are not able to detect particular reentrancy patterns in general.

According to embodiments of the invention, a possible fix for reentrancy vulnerabilities can be implemented through the use of locks for state variables. The analysis of bytecode suffers from overtainting due to a lack of field-sensitivity as there is no type information available at the EVM level. This overtainting may lead to the locking of much more storage than necessary on the EVM level. Overtainting and therefore locking more storage than necessary results in higher false positives. When analyzing source code instead, the type information is available, and overtainting can be prevented. According to embodiments, it is therefore focused on source code patching in order to provide patches with reduced overhead over patches created at the byte code level. Source code patching further enables the developers to review the modification added by an embodiment of the invention before deploying the smart contract. Up until now, most solutions focused on bytecode level patching, which incur a higher overhead and prevented developers to investigate the exact modification introduced by the patch since it was only performed at the bytecode level.

Known defense mechanisms often utilize compiler-based instrumentation mechanisms to implement their policies. Such approaches suffer from intransparency, as the resulting binary does not only reflect the source code, but also the (compiler-dependent) policies. While this might be tolerated in many application domains, developers of smart contracts need more transparency and control over the contracts code. Therefore, according to embodiments of the invention, rewriting the source code instead of using instrumentation mechanisms preserves the inspectability and mutability of the source code. The overhead of source code patches in accordance with embodiments of the invention is also quite low: often just a few lines of code are able to effectively mitigate a vulnerability. Source code rewriting therefore enables the developers to verify the changes made by embodiments using the same methods as they could before, e.g., manual code reviews, formal verification or other analysis tools.

To prevent developers from deploying smart contracts that are susceptible to reentrancy attacks, embodiments of the invention represents a hardening contract compiler (HCC) as a toolchain that automatically finds and fixes reentrancy vulnerabilities and fixes them in the source code, therefore preserving inspectability. While the present disclosure predominantly focuses on the automated detection and prevention of reentrancy vulnerabilities and integer overflows and underflows, a CPG-based approach in accordance with embodiments of the invention can be designed to be open for extension to other kinds of vulnerabilities. The primary goal for HCC is to enable security analysis for smart contracts and assist the developers in the development of new and secure smart contracts. However, the compilation toolchain in accordance with embodiments can also be employed to facilitate the manual patching workflow for already deployed contracts.

Figure 2:
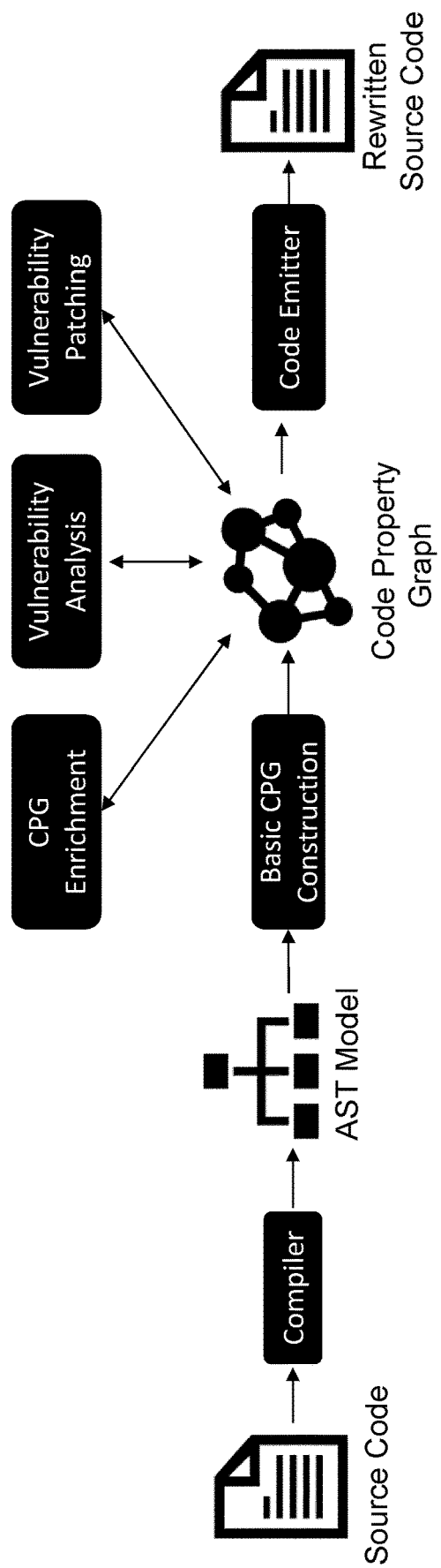
FIG. 2 is a schematic view illustrating a method and a system in accordance with an embodiment of the present invention, wherein the embodiment provides an architecture of a hardening contract compiler (HCC) comprising a toolchain for automated discovery and patching of reentrancy vulnerabilities.

FIG. 2 shows a schematic view illustrating a method and a system in accordance with an embodiment of the present invention, wherein the embodiment provides an architecture of a hardening contract compiler (HCC) comprising a toolchain for automated discovery and patching of reentrancy vulnerabilities. Rewriting the source code of smart contracts can automatically happen in multiple phases.

As illustrated by FIG. 2, the HCC takes the source code of a smart contract as an input. First, the source code needs to be translated into a model that facilitates analysis. The source code is first translated into an abstract syntax tree (AST) model by a compiler, and then gets analysed to construct a basic form of a code property graph (CPG). A CPG is a representation of a program that unifies different perspectives on a program, that are commonly achieved through static analysis. The CPG is then enriched with information that could already be inferred from the AST. However, in this state the CPG is basically just a different representation of the AST, so the CPG can already be extended based on itself. After that the CPG includes basic information that is used for many analyses, e.g. information about data flow.

Trivially, vulnerabilities have to be found first before they can be patched. Once the CPG enrichment phase is completed, HCC checks for vulnerability patterns in the vulnerability detection phase. These vulnerability patterns can be expressed in the form of different subgraphs of the CPG. The presence of a particular subgraph in the CPG indicates that the contract is susceptible to the associated vulnerability.

Once all patterns associated with a vulnerability are found the vulnerability discovery ends and the vulnerability patching phase starts.

During the vulnerability patching phase HCC applies patches that fix this vulnerability and inserts them directly into the CPG. Those patches are specifically crafted for the individual vulnerability patterns. When designing and applying patches it is important to ensure that the fixes applied by HCC do not break any desirable functionality, e.g. the business logic of the contract has to stay intact.

The vulnerability patching phase ends after applying the patching schemes for all the vulnerabilities found prior. When this is the case, HCC traverses the patched CPG to generate the new source code. The rewritten source code is then ready for further review and verification or compilation.

Basic CPG construction: As shown in FIG. 2, the construction of the basic CPG leverages the AST of the source code. The information in the AST includes every high-level detail of the source code, although the individual components of the AST are very granular. This means that HCC can analyse code on subexpression level while also being able to conduct analysis across contract boundaries.

CPG Enrichment: Utilizing the information the basic CPG already contains, HCC can conduct several analyses during the CPG enrichment phase. During this phase, the information of the CPG is enhanced in a way that more sophisticated analyses are made possible. In case of HCC, the enrichment phase may comprise multiple analyses that make the relevant information for reentrancy detection more accessible for further analysis. The enrichment phase serves as a precursor to a more sophisticated vulnerability detection.

In the following, it is predominantly focused on reentrancy vulnerabilities and integer overflow and underflow bugs. Therefore, the CPG enrichment phase in HCC may comprise the following analyses:

Call-Analysis: When searching for reentrancy vulnerabilities, it is crucial to know where exactly external function calls happen in a smart contract code. To achieve this, HCC iterates over all function Call expressions in the CPG and labels each call with ExternalCall. An external call is every call that happens when a function of another contract is called directly or if using the call and delegatecall functions associated with the type address. The latter is not only labelled as an ExternalCall but also as a DelegateCall. This is sufficient to detect the traditional, cross-function and delegated reentrancy vulnerability patterns that were introduced above. To also detect create-based reentrancy, HCC labels NewExpressions in the CPG as a ConstructorCall if the type that is being created is defined by another contract. To create new contracts using a NewExpression, the code of the smart contract has to be available in the CPG, which allows to analyse functions across contract-boundaries.

After labelling every function call, HCC labels the functions that contain them with ContainsDelegateCall, ContainsExternalCall and ContainsConstructorCall where appropriate. Note that HCC iterates over all function calls in the CPG and that their surrounding functions may be part of different contracts. This means that a ConstructorCall calls a function that either was subject to this analysis or does not contain function call.

Contains-Call-Analysis: With the call analysis described above HCC analyzed function calls on expression-level. However, most expressions are sub expressions of statements and although it is not necessary this can be the case for function calls, too. Because statements are treated as atomic control flow units (comparable to basic blocks) of a function in the CPG, it is easier to reason about function calls on statement-level during the vulnerability detection and patching phases. HCC therefore analyses the sub expressions of every Statement in the CPG to find function calls and labels the Statement appropriately.

Write-State-Analysis: Reentrancy vulnerabilities happen when the victim contract is left with inconsistent state. As described before, this happens if a contract is unexpectedly reentered after an external call before the state is updated. To effectively find statements that update state in the vulnerability detection phase HCC may follow a two step approach:

In the first analysis step, HCC collects all statements that change state variables of a contract. The collected statements and their surrounding functions are then labelled WritesState and an edge to the manipulated state variable is added. This edge has the label WRITES.

In the second step of the write state analysis HCC collects all internal function calls calling functions that update the contracts state. Those calls and their surrounding functions receive labels and edges just like the statements above, but this second step is to be repeated until no new labels were added to the CPG.

As becomes clear, the CPG enrichment phase is tailored towards the use case of HCC. The detection of other kinds of vulnerabilities may have different needs and the CPG enrichment may be extended towards those needs.

Vulnerability Detection

In the vulnerability detection phase in accordance with embodiments of the invention, HCC searches for the different vulnerability patterns in the code property graph. Whenever a subgraph matching a vulnerability pattern is found, the involved graph nodes are collected and a new vulnerability node is inserted in the CPG. This vulnerability node has edges to all the involved graph nodes. The number of edges, their label and the meaning depend on the kind of vulnerability that is found.

Detecting Reentrancy: The detection of reentrancy vulnerabilities may be implemented as follows. First, HCC queries the CPG for statements $s_w$ that write state and the surrounding function f. Then HCC searches for external calls $c_e$ that, considering the control flow of f, transitively lead from $c_e$ to $s_w$. It also captures the state variable sv, which is manipulated by $s_w$. If such a pattern is found, the HCC queries the CPG for all functions $f_c$ that belong to the same contract and that also write to sv. This approach works for traditional reentrancy as well as cross-function reentrancy and delegated case (ii) reentrancy.

For delegated case (i) reentrancy, HCC queries the CPG for external calls $c_e$ that, considering the control flow, transitively lead to a delegated call $c_d$.

The detection of create-based reentrancy in HCC may be implemented almost like the basic detection described above. The CPG is queried for statements $s_w$ that write state and the surrounding function f. Instead of external calls, the create-based reentrancy detection searches for constructor calls $c_c$ that, considering the control flow of f, transitively lead from $c_c$ to $s_w$. However, the CPG-based analysis allows HCC to analyze the constructor that is being called. In this way, HCC will only report this vulnerability if the constructor contains an external call. This is useful because reentrancy cannot happen if no external call is made. If the con-structor calls an external function, HCC again queries the CPG for all functions that belong to the same contract and that also write to sv.

Detecting Integer Bugs: The vulnerability detection for integer bugs may be implemented as follows: HCC queries the CPG for all nodes that represent either a subtraction, addition or multiplication that are part of an assignment statement. This is reasonable, since an integer bug can only be harmful to the smart contract if the result of a computation is stored. HCC collects the computation, its left and right expressions, the assignment statement and the expression the value gets assigned to.

To ease the patching of underflows, also the statement that leads to the assignment statement is collected.

Vulnerability Patching

To patch detected vulnerabilities HCC iterates over all the vulnerability nodes inserted during the vulnerability detection phase. Trivially, applying patches depends on the vulnerability that is to be patched.

Patching Reentrancy: HCC uses the same patch pattern for all reentrancy schemes except for delegated case (i) reentrancy. In the following, it is described first the general procedure before the procedure for delegated case (i) reentrancy is described.

Remember that the reentrancy consists of a state variable $s_v$, a statement $s_w$, that writes to this state variable, an external function call $c_e$, the surrounding function f and a set of cross-function $f_c$ that also write to sv. As a first step, HCC creates a lock variable ($l_{sv}$) for sv as a state variable. This includes a check if sv already has a lock variable. The type of the variable depends on the type of sv itself, e.g. if sv has a basic type like unit 256, $l_{sv}$ will have type bool, but for mapping types only the value type will be bool.

After $l_{sv}$ is either found or inserted to the CPG, HCC generates assignment statements that set the state of $l_{sv}$. The locking statement lock_$l_{sv}$ sets the value to true, and the unlocking statement unlock_$l_{sv}$ sets the value to false. HCC then changes the control flow of f in such a way that the locking statement, the external call and the unlocking statement directly follow each other: lock_$l_{sv}$→$c_e$→unlock_$l_{sv}$.

After the control flow is altered, HCC creates a guard that checks for $l_{sv}$ to be unlocked and inserts it at the beginning of the function f. The creation and insertion of guards also happens with all the other functions $f_c$ that write to sv.

The patch for delegated case (i) reentrancy may be implemented a bit differently: HCC cannot detect which (or whether) any state will be written in the delegated call $c_d$. Therefore, it is inserted a main lock as a state variable. Afterwards, it is surround the external call $c_e$ as well as the delegated call $c_d$ with the locking and unlocking statements for this lock. Guards for the main lock are then inserted at the beginning of every publicly callable function.

Patching Integer Bugs: The different integer bugs may be patched through the insertion of assertions. For multiplications and additions, the assertions are added after the operation in the control flow. For subtractions, the assertion is added before the operation in the control flow.

With respect to an evaluation of effectiveness and functional correctness, once a smart contract has been patched, HCC may evaluate all existing transactions to ensure that the functional correctness of the patched smart contract is preserved and that the vulnerability has been correctly patched.

As the patches applied by HCC may not break the functionality of a smart contract, HCC in accordance with embodiments may evaluate after the following aspects:

Patch effectiveness: verify that HCC effectively patches the known vulnerabilities, which are available in the dataset. This includes replaying available exploit transactions on a modified Ethereum node.

Functional correctness: verify that HCC does not break the smart contract. To validate this all transactions of the original contract are run on the patched contract. For this it is also used a modified Ethereum node.

With respect to validating an implementation of HCC in accordance with an embodiment of the invention, a prototype for HCC can be built in Kotlin, which is a language on top of the JVM. This prototype may rely on the Solidity compiler (cf. The Solidity Programming Language, retrievable at https://github.com/ethereum/solidity/) to create the abstract syntax tree (AST) of a source file and emit it as JSON. HCC may consume the AST and constructs the code property graph (CPG). This prototype may use Neo4j (cf. Neo4j Graph Platform retrievable at https://neo4j.com/) to store and analyse the CPG.

Many modifications and other embodiments of the invention set forth herein will come to mind to the one skilled in the art to which the invention pertains having the benefit of the teachings presented in the foregoing description and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

While subject matter of the present disclosure has been illustrated and described in detail in the drawings and foregoing description, such illustration and description are to be considered illustrative or exemplary and not restrictive. Any statement made herein characterizing the invention is also to be considered illustrative or exemplary and not restrictive as the invention is defined by the claims. It will be understood that changes and modifications may be made, by those of ordinary skill in the art, within the scope of the following claims, which may include any combination of features from different embodiments described above.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

The invention claimed is:

1. A computer-implemented method for supporting smart contracts in a blockchain network, the method comprising:
translating a source code of a smart contract into an abstract syntax tree model;
generating a code property graph based on the abstract syntax tree model;
performing an enrichment phase, wherein the code property graph is enriched with information that is inferable from the abstract syntax tree model;
performing a vulnerability detection phase, wherein the code property graph is checked for one or more predetermined vulnerability patterns in order to detect one or more predetermined vulnerabilities, and wherein performing the vulnerability detection phase comprises:
querying the code property graph for statements ($s_w$) that write state and a surrounding function (f);
searching for external function calls ($c_e$) that, considering control flow of the surrounding function (f), transitively lead from the ($c_e$) to the ($s_w$);
capturing a state variable (sv), which is manipulated by the ($s_w$); and
querying the code property graph for all functions ($f_c$) that belong to the smart contract and that write to the (sv); and
performing a vulnerability patching phase, wherein one or more patches are applied in order to fix the one or more predetermined vulnerabilities detected in the vulnerability detection phase, wherein the one or more patches are inserted into the code property graph such that a patched code property graph is generated.

2. The computer-implemented method according to claim 1, wherein the blockchain network is a distributed network comprising nodes, and wherein a blockchain enables the nodes to participate in transactions with each other through use of cryptographically secure signatures.

3. The computer-implemented method according to claim 1, wherein the smart contract is triggered whenever a transaction is sent to an address associated with the smart contract, and wherein the smart contract is executed in a virtual machine by nodes that verify and append transactions to a blockchain.

4. The computer-implemented method according to claim 1, wherein the code property graph includes a combined representation of a control flow graph, a data flow graph and/or a dominator tree.

5. The computer-implemented method according to claim 1, wherein performing the enrichment phase comprises a call-analysis, wherein the call-analysis comprises:
iterating over function call expressions in the code property graph; and
assigning a call label to each external function call.

6. The computer-implemented method according to claim 1, wherein performing the enrichment phase comprises a contains-call-analysis, wherein the contains-call-analysis comprises:
analyzing sub-expressions of statements in the code property graph to find function calls; and
assigning a call label to each statement having the external function call.

7. The computer-implemented method according to claim 1, wherein performing the enrichment phase comprises a write-state-analysis, wherein the write-state-analysis comprises:
collecting statements that change state variables of the smart contract;
assigning a first write-state-label to the collected statements and surrounding functions of the collected statements;
collecting internal function calls calling functions that update/write state variables;

assigning a second write-state-label to the collected internal function calls and surrounding functions of the collected internal function calls.

8. The computer-implemented method according to claim 1, wherein the one or more predetermined vulnerabilities include reentrancy, integer overflow bugs and/or integer underflow bugs.

9. The computer-implemented method according to claim 1, wherein the one or more predetermined vulnerability patterns is expressed in a form of a subgraph, and wherein performing the vulnerability detection phase further comprises searching for the subgraph within the code property graph of the smart contract.

10. The computer-implemented method according to claim 1, wherein performing the vulnerability detection phase further comprises:
searching for constructor calls ($c_c$) that, considering control flow of the surrounding function (f), transitively lead from the ($c_c$) to the ($s_w$), and that call the external function calls ($c_e$).

11. The computer-implemented method according to claim 10, wherein performing the vulnerability patching phase further comprises:
providing a lock variable ($l_{sv}$) for the (sv) as a state variable,
generating assignment statements that set a state of the ($l_{sv}$), wherein a locking statement (lock_$l_{sv}$) sets a value to true, and an unlocking statement (unlock_$l_{sv}$) sets the value to false; and
changing the control flow of the surrounding function (f) in such a way that the locking statement, the external function calls ($c_e$) or the constructor calls ($c_c$), and the unlocking statement directly follow each other as follows: lock_$l_{sv}$→$c_e$ or $c_c$→unlock_$l_{sv}$.

12. The computer-implemented method according to claim 1, wherein the one or more patches are specifically crafted for the one or more vulnerability patterns.

13. The computer-implemented method according to claim 1, wherein the patched code property graph is traversed to generate a new source code for the smart contract that incorporates the one or more applied patches.

14. A computer system for supporting smart contracts in a blockchain network, the system comprising memory and one or more processors, which, alone or in combination, are configured to provide for execution of a method comprising:
translating a source code of a smart contract into an abstract syntax tree model;
generating a code property graph based on the abstract syntax tree model;
performing an enrichment phase, wherein the code property graph is enriched with information that is obtained from the abstract syntax tree model;
performing a vulnerability detection phase, wherein the code property graph is analyzed for one or more predetermined vulnerability patterns in order to detect one or more predetermined vulnerabilities, and wherein performing the vulnerability detection phase comprises:
querying the code property graph for statements ($s_w$) that write state and a surrounding function (f);
searching for external function calls ($c_e$) that, considering control flow of the surrounding function (f), transitively lead from the ($c_e$) to the ($s_w$);
capturing a state variable (sv), which is manipulated by the ($s_w$); and
querying the code property graph for all functions ($f_c$) that belong to the smart contract and that write to the (sv); and
performing a vulnerability patching phase, wherein one or more patches are applied in order to fix the one or more predetermined vulnerabilities detected in the vulnerability detection phase, wherein the one or more patches are inserted into the code property graph such that a patched code property graph is generated.

15. A computer-implemented method for supporting smart contracts in a blockchain network, the method comprising:
translating a source code of a smart contract into an abstract syntax tree model;
generating a code property graph based on the abstract syntax tree model;
performing an enrichment phase, wherein the code property graph is enriched with information that is inferable from the abstract syntax tree model;
performing a vulnerability detection phase, wherein the code property graph is checked for one or more predetermined vulnerability patterns in order to detect one or more predetermined vulnerabilities, and wherein performing the vulnerability detection phase comprises:
querying the code property graph for statements ($s_w$) that write state and surrounding function (f);
searching for constructor calls ($c_c$) that, considering control flow of the surrounding function (f), transitively lead from ($c_c$) to ($s_w$), and that call an external function call ($c_e$);
capturing a state variable (sv), which is manipulated by ($s_w$); and
querying the code property graph for all functions ($f_c$) that belong to the smart contract and that write to (sv); and
performing a vulnerability patching phase, wherein one or more patches are applied in order to fix the one or more predetermined vulnerabilities detected in the vulnerability detection phase, wherein the one or more patches are inserted into the code property graph such that a patched code property graph is generated.

16. The computer-implemented method according to claim 15, wherein the blockchain network is a distributed network comprising nodes, and wherein a blockchain enables the nodes to participate in transactions with each other through use of cryptographically secure signatures.

17. The computer-implemented method according to claim 15, wherein the smart contract is triggered whenever a transaction is sent to an address associated with the smart contract, and wherein the smart contract is executed in a virtual machine by nodes that verify and append transactions to a blockchain.

18. The computer-implemented method according to claim 15, wherein the code property graph includes a combined representation of a control flow graph, a data flow graph and/or a dominator tree.

19. The computer-implemented method according to claim 15, wherein performing the enrichment phase comprises a call-analysis, wherein the call-analysis comprises:
iterating over function call expressions in the code property graph; and
assigning a call label to each external function call.

20. The computer-implemented method according to claim 15, wherein performing the enrichment phase comprises a contains-call-analysis, wherein the contains-call-analysis comprises:

analyzing sub-expressions of statements in the code property graph to find function calls; and assigning a call label to each statement having the external function call.

* * * * *